US012632096B2

(12) United States Patent
Brandt

(10) Patent No.: US 12,632,096 B2
(45) Date of Patent: May 19, 2026

(54) PEAK POWER CONTROL OF A MEMORY SYSTEM

(71) Applicant: Micron Technology, Inc., Boise, ID (US)

(72) Inventor: Kevin R. Brandt, Boise, ID (US)

(73) Assignee: Micron Technology, Inc., Bosie, ID (US)

( * ) Notice: Subject to any disclaimer, the term of this patent is extended or adjusted under 35 U.S.C. 154(b) by 97 days.

(21) Appl. No.: 18/782,550

(22) Filed: Jul. 24, 2024

(65) Prior Publication Data

US 2025/0190045 A1     Jun. 12, 2025

Related U.S. Application Data

(60) Provisional application No. 63/608,037, filed on Dec. 8, 2023.

(51) Int. Cl.
| | |
|---|---|
| *G06F 1/26* | (2006.01) |
| *G06F 1/3225* | (2019.01) |
| *G06F 1/3234* | (2019.01) |
| *G06F 1/3203* | (2019.01) |

(52) U.S. Cl.
CPC .......... *G06F 1/3225* (2013.01); *G06F 1/3275* (2013.01); *G06F 1/3203* (2013.01)

(58) Field of Classification Search
CPC ........................... G06F 1/3225; G06F 1/32751
USPC .......................................................... 713/320
See application file for complete search history.

(56) References Cited

U.S. PATENT DOCUMENTS

| | | | | |
|---|---|---|---|---|
| 9,348,529 | B1 * | 5/2016 | Khatib | .................... G11B 19/02 |
| 2013/0332753 | A1 * | 12/2013 | Varma | ................... G06F 1/3287 |
| | | | | 713/300 |
| 2014/0068296 | A1 * | 3/2014 | Byom | ................... G06F 9/5094 |
| | | | | 713/320 |
| 2017/0192479 | A1 | 7/2017 | Lee | |
| 2019/0155363 | A1 | 5/2019 | Vaccaro | |
| 2021/0096989 | A1 * | 4/2021 | Yang | ..................... G11C 11/413 |
| 2021/0248032 | A1 * | 8/2021 | Kang | ................. G06F 11/1068 |
| 2022/0246220 | A1 * | 8/2022 | Sforzin | .............. G11C 16/0483 |
| 2022/0300158 | A1 * | 9/2022 | Kushida | ............... G06F 3/0653 |

(Continued)

OTHER PUBLICATIONS

"International Search Report and Written Opinion of the International Searching Authority," issued in connection with Int'l Appl. No. PCT/US2024/039584, dated Nov. 7, 2024 (9 pages).

*Primary Examiner* — Volvick Derose
(74) *Attorney, Agent, or Firm* — Holland & Hart LLP

(57) ABSTRACT

Methods, systems, and devices for peak power control of a memory system are described. The method may include operating the memory system according to a first policy for managing power consumed by the memory system. In some examples, the first policy may be based on a ratio between a peak power consumed by the memory system and an average power consumed by the memory system over a duration. Further, the method may include monitoring one or more power characteristics associated with operating the memory system and operating the memory system according to a second policy for managing the power consumed by the memory system based on the one or more power characteristics satisfying a condition. In some examples, operating the memory system according to the second policy may include activating a peak power management (PPM) feature of the memory system.

20 Claims, 5 Drawing Sheets

(56) References Cited

U.S. PATENT DOCUMENTS

| | | | |
|---|---|---|---|
| 2022/0413583 A1* | 12/2022 | Hassan ................. | G06F 3/0625 |
| 2023/0297254 A1* | 9/2023 | Onodera .............. | G06F 3/0634 |
| | | | 711/154 |
| 2025/0165321 A1* | 5/2025 | Vlaiko .................. | G06F 11/004 |

* cited by examiner

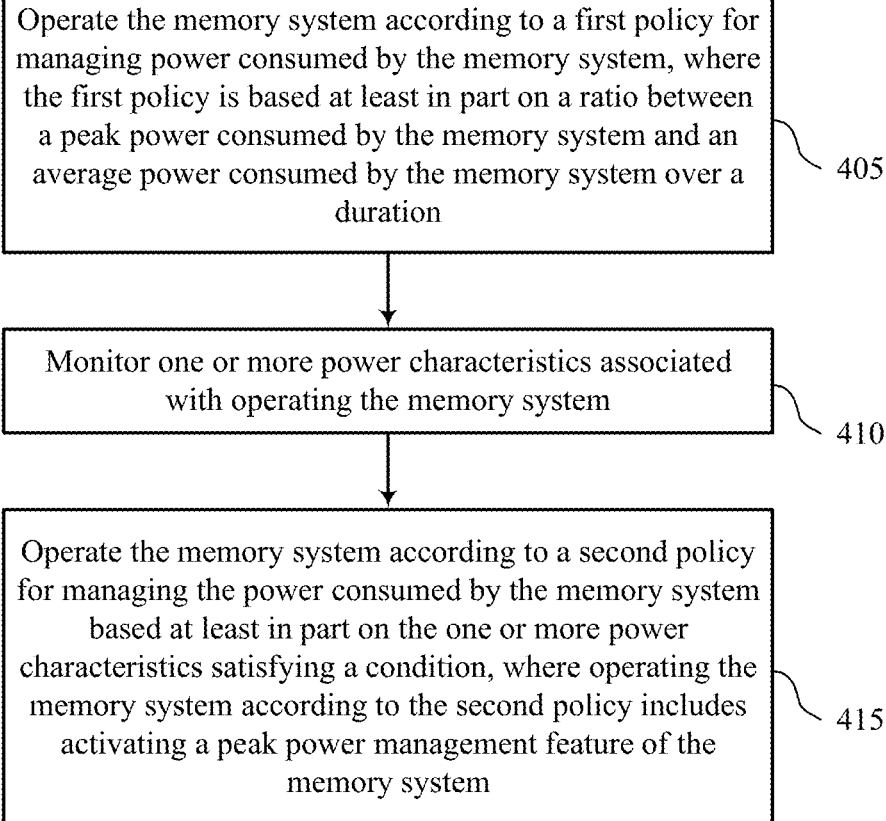

Operate the memory system according to a first policy for managing power consumed by the memory system, where the first policy is based at least in part on a ratio between a peak power consumed by the memory system and an average power consumed by the memory system over a duration

405

Monitor one or more power characteristics associated with operating the memory system

410

Operate the memory system according to a second policy for managing the power consumed by the memory system based at least in part on the one or more power characteristics satisfying a condition, where operating the memory system according to the second policy includes activating a peak power management feature of the memory system

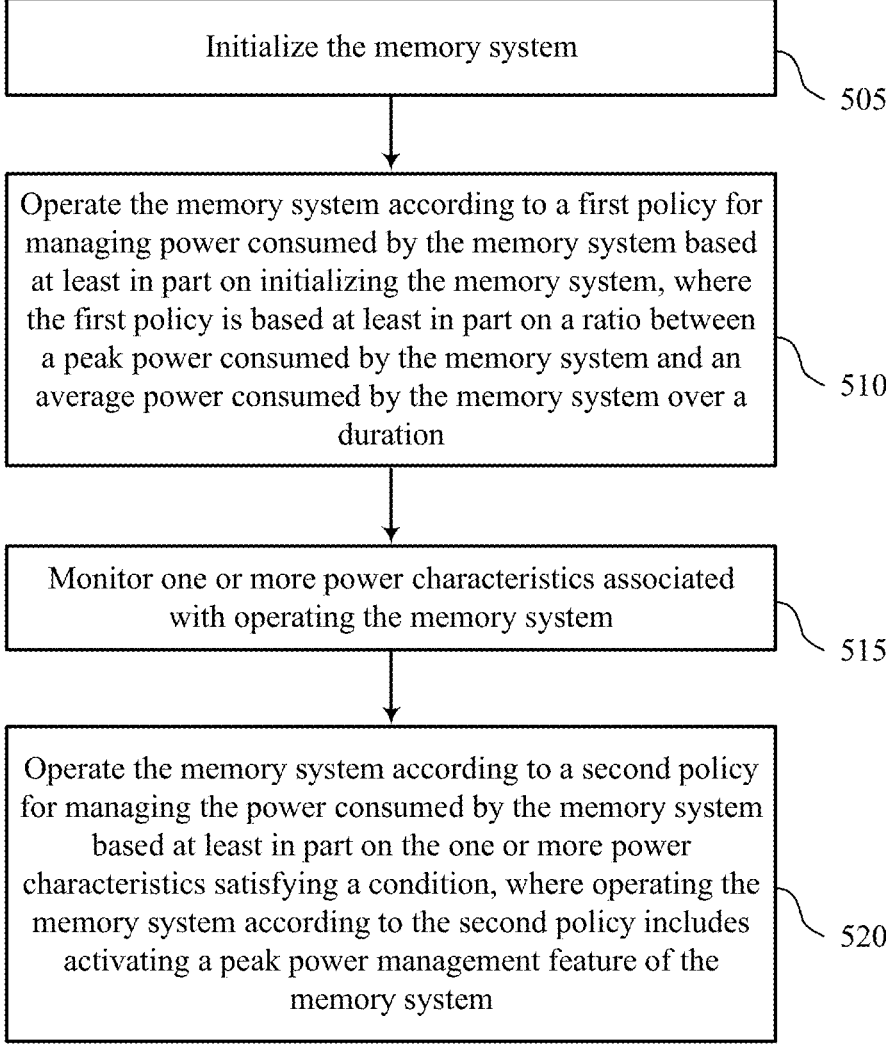

Initialize the memory system

505

Operate the memory system according to a first policy for managing power consumed by the memory system based at least in part on initializing the memory system, where the first policy is based at least in part on a ratio between a peak power consumed by the memory system and an average power consumed by the memory system over a duration

510

Monitor one or more power characteristics associated with operating the memory system

515

Operate the memory system according to a second policy for managing the power consumed by the memory system based at least in part on the one or more power characteristics satisfying a condition, where operating the memory system according to the second policy includes activating a peak power management feature of the memory system

PEAK POWER CONTROL OF A MEMORY SYSTEM

CROSS REFERENCE

The present application for patent claims priority to U.S. Patent Application No. 63/608,037 by Kevin R. Brandt, entitled "PEAK POWER CONTROL OF A MEMORY SYSTEM," filed Dec. 8, 2023, which is assigned to the assignee hereof, and which is expressly incorporated by reference in its entirety herein.

TECHNICAL FIELD

The following relates to one or more systems for memory, including peak power control of a memory system.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIGS. 4 and 5 show flowcharts illustrating a method or methods that support peak power control of a memory system in accordance with examples as disclosed herein.

DETAILED DESCRIPTION

Figure 1:
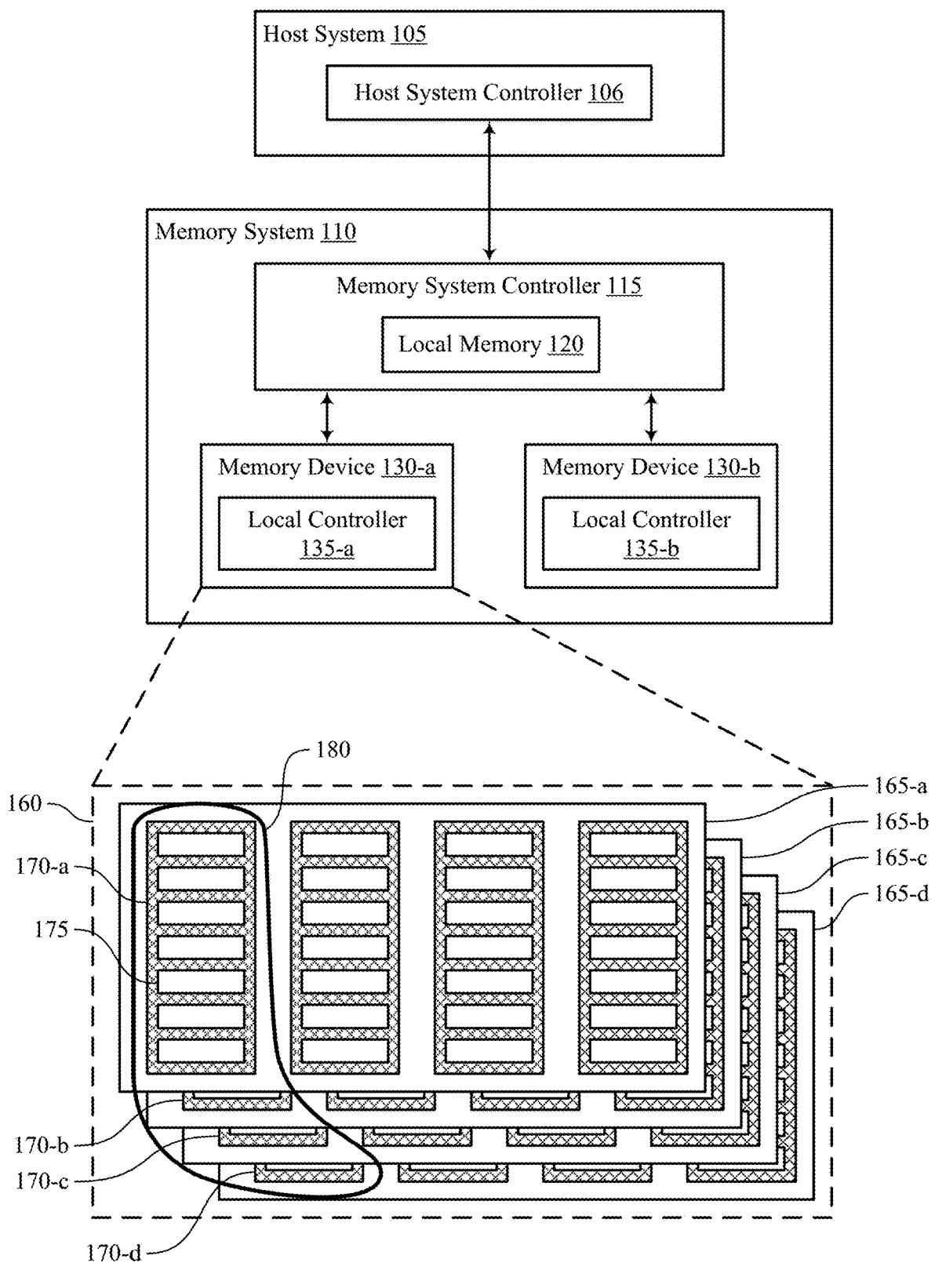
FIG. 1 shows an example of a system that supports peak power control of a memory system in accordance with examples as disclosed herein.

A memory system may operate according to one or more power parameters. An example of the one or more power parameters may be a power state that specifies a maximum average power that the memory system may consume over a period of time. The host system may provide the power state to the memory system and may update the power state according to the needs of the memory system. Although the memory system may abide by the power state specified by the host system, the memory system may experience instantaneous spikes in power consumption (e.g., due to performing concurrent memory operations). For example, a memory system whose power state is 15 Watts (W) may experience a power spike of 22.5 W. At a relatively low power state (e.g., 15 W), the spike in power may have little to no negative effects on the memory system because the memory system and the host system may be capable of handling power greater than the power spike (e.g., power greater than 22.5 W). However, as the power state increases (e.g., increases to 40 W), the power spikes may be too high for the host system and the memory system to manage.

As described herein, the memory system may activate or deactivate power management techniques on an as-needed basis such that the memory system may reduce a peak power to average power ratio of the memory system without unnecessary performance loss. Upon initialization of the memory system, the memory system may deactivate power management techniques and monitor one or more power characteristics of the memory system. As an example, the memory system may monitor a power state of the memory system, a load metric for operating the memory system, or both.

The memory system may then determine whether the one or more power characteristics satisfy a condition. As one example, the condition may include the power state exceeding a threshold (e.g., a threshold of 40 W). If the one or more power characteristics satisfy the condition, the memory system may activate power management techniques to reduce the peak power to average ratio of the memory system. Further, the memory system may deactivate the power management techniques, if, after activating the power management techniques, the power characteristics no longer satisfy the condition (e.g., the power state falls below the threshold). Using the methods as described herein may allow the memory system to selectively activate power management techniques such that power spikes that are too expensive for the host system and the memory system to manage may be avoided.

In addition to applicability in memory systems as described herein, techniques for peak power control of a memory system may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by selectively reducing a peak power to average power ratio of the memory system when power spikes are too expensive for the memory system or the host system to manage, which may decrease system latency due to performing peak power management (PPM) techniques in a static manner and may decrease component damage due to operating the memory system at a high power (e.g., 40 W) with a high peak to average power ratio (e.g., 1.5), among other benefits.

Features of the disclosure are illustrated and described in the context of systems, devices, and circuits. Features of the disclosure are further illustrated and described in the context of flowcharts.

FIG. 1 shows an example of a system 100 that supports peak power control of a memory system in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support peak power control of a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

As described herein, a memory system 110 may dynamically update a policy for managing power consumption of the memory system 110 based on power characteristics. Initially (e.g., after booting up the memory system 110 or initializing the memory system 110), the memory system 110 may operate according to a first policy for managing power consumed by the memory system 110. In some examples, operating according to the first policy may include deactivating a PPM feature of the memory system 110 or adjusting one or more parameters associated with the PPM feature of the memory system 110. The PPM feature may allow the memory system 110 to reduce a peak power to average power ratio of the memory system 110 using one or more techniques.

While operating according to the first policy, the memory system 110 may monitor one or more power characteristics of the memory system 110. The one or more power characteristics may include a power state configured for the memory system 110, a load metric for operating the memory system 110, or both. If the memory system 110 determines that the one or more power characteristics satisfy a condition (e.g., exceeding a threshold), the memory system 110 may operate according to a second policy for managing power consumed by the memory system 110 that is different from the first policy. Operating according to the second policy may include activating the PPM feature of the memory system 110. Similarly, the memory system 110 may update the policy from the second policy back to the first policy if the one or more power characteristics no longer satisfy the condition. Allowing the memory system 110 to dynamically update the policy for managing power consumption may result in an overall performance increase of the memory system 110 when compared to other methods for power management.

Figure 2:
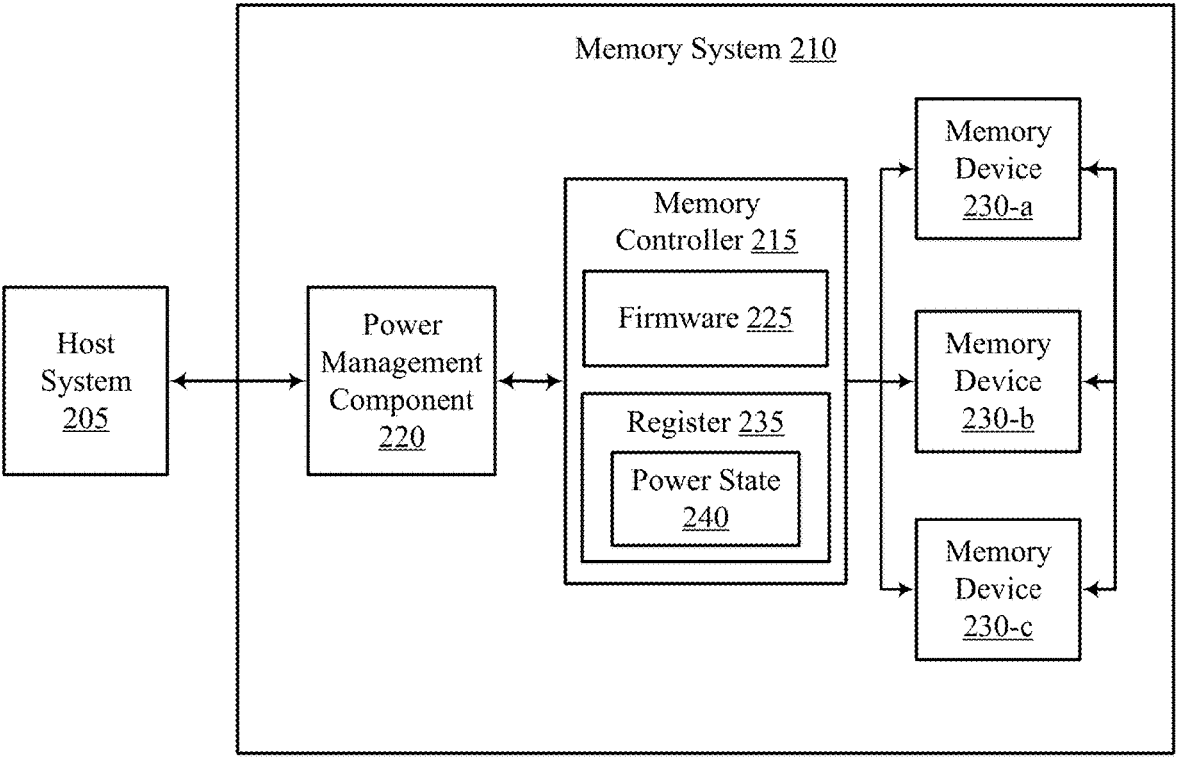
FIG. 2 shows an example of a system that supports peak power control of a memory system in accordance with examples as disclosed herein.

FIG. 2 shows an example of a system 200 that supports peak power control of a memory system in accordance with examples as disclosed herein. In some examples, the system 200 may implement, or be implemented by, aspects of a system 100. For example, the system 200 may include a host system 205, a memory system 210, a memory controller 215, and memory devices 230 which may be examples of a host system 105, a memory system 110, a memory system controller 115, and memory devices 130, respectively, as described with reference to FIG. 1.

As the memory system 210 performs memory operations (e.g., read operations or write operations), the memory system 210 may consume power. In an effort to control the power consumed by the memory system 210, the host system 205 may indicate, to the memory system 210, a power state 240 for the memory system 210. The power state 240 may be a parameter that indicates a maximum average power that the memory system 210 may consume for any workload over a time window (e.g., a 10 second window). In some examples, the memory system 210 may support up to 32 power states. Some examples of power states that the memory system 210 may support include 15 W, 25 W, 30 W, 40 W, etc.

To indicate the power state 240 to the memory system 210, the host system 205 may write the power state 240 to a memory location of a register 235 (e.g., a mode register) associated with the memory controller 215 of the memory system 210. To obtain the power state 240, the memory system 210 (or the memory controller 215) may read (e.g., using mode register read) the power state 240 from the memory location within the register 235. In some examples, the power state 240 for the memory system 210 may be dynamic, meaning that the host system 205 may update or change the power state 240 stored in the register 235 over time and, in some examples, in response to a change in an operating mode of the memory system 210. As an example, the host system 205 may increase the power state 240 of the memory system 210 when the operating mode of the memory system 210 changes from sleep mode to working mode.

Although the memory system 210 may consume an average power that is less than or equal to the power state 240, the memory system 210 may encounter power spikes. During power spikes, the memory system 210 may consume more power than the maximum average power indicated by the power state 240 (e.g., 1.5 times the power indicated by the power state 240). Power spikes may occur when the memory system 210 attempts to perform multiple concurrent memory operations such as attempting to access multiple memory devices 230 during same or overlapping time periods.

When operating at a relatively high power state (e.g., 40 W), the effects of power spikes on the memory system 210 may be more detrimental when compared to operating at a lower power state (e.g., 15 W). As described above, the power consumed by the memory system 210 may increase 1.5 times the maximum average power indicated by the power state 240 during power spikes. For example, at a low power state (e.g., a 15 W power state), the power consumed by the memory system 210 may spike to 22.5 W and, at a high power state (e.g., a 40 W power state), the power consumed by the memory system 210 may spike to 60 W. Although the peak power to average power ratio (e.g., 1.5) of the memory system 210 is the same for both the high power state and the low power state, managing 60 W versus 22.5 W may be different for the memory system 210 and the host system 205. For example, operating the memory system 210 at such a high power (e.g., 60 W) may be expensive for the host system 205 and can potentially cause damage to components of the memory system 210 because the memory components may be rated for a lower power (e.g., up to 40 W).

Therefore, it may be beneficial to reduce the peak power to average power ratio of the memory system 210 in some scenarios (e.g., while the memory system 210 is operating at high power states). In order to reduce the peak power to average power ratio, the memory system 210 may employ a feature known as PPM. To turn on the PPM feature, the host system 205 may transmit a set features command to the memory system 210, which may allow the memory system 210 to turn on (e.g., activate) the feature for the duration of its operation. In other words, once the PPM feature is turned on, it remains on. Once on, the memory system 210 may adjust one or more parameters to reduce the peak power to average power of the memory system 210.

For example, with the PPM feature turned on, the memory system 210 may update timing parameters corresponding to memory operations to avoid performing the memory operations at multiple memory devices 230 in parallel or during a same or overlapping time periods. As an example, the memory system 210 may receive a command to access the memory device 230-a. Prior to performing the access command however, the memory device 230-a may communicate with the memory device 230-b and the memory device 230-c to determine whether the memory device 230-b or the memory device 230-b are currently being accessed or soon to be accessed. If access operations are active at one or both of the memory device 230-b or the memory device 230-c, the memory device 230-a may delay the access operation in order to avoid performing the access operation during a same or overlapping time period as an access operation performed at the memory device 230-b or the memory device 230-c.

Additionally or alternatively, when the PPM feature is turned on, the memory system 210 may update a set of trim parameters that are used to operate to the memory system 210. Trim parameters may be examples of operational parameters (e.g., voltage parameters) that the memory system 210 may abide by while performing memory operations. Initially (e.g., at power up), the memory system 210 may load a first set of trim parameters and upon turning on the PPM feature, the memory system 210 may load a second set of trim parameters that include different operational parameters than the first set of trim parameters.

When activated, the PPM feature may reduce the peak power to average power ratio of the memory system 210. However, in addition to reducing the peak power to average power ratio, activating the PPM feature may also decrease the performance of the memory system 210 for performing operations requested by the host system 205. For example, delaying memory operations may effectively increase timing parameters such as time to program ($t_{PROG}$) and time to read ($t_R$) which may increase the latency of the system and may potentially cause cascading effects with other memory operations causing further latency.

As discussed above, the enablement of the PPM feature may not be dynamic while the memory system 210 is operating. That is, once the PPM feature is turned on, it remains on even in situations when peak power to average power ratio reduction is not needed (e.g., when the power state 240 of the memory system 210 is low or 15 W). This may result in unnecessary performance loss (e.g., increased latency) at the memory system 210 and as such, it may be beneficial to activate the PPM feature on an as-needed basis.

As described herein, a memory system 210 may dynamically activate a power management feature (e.g., the PPM feature) based on one or more power characteristics of the memory system 210. In some examples, during operation of the memory system 210, the memory system 210 may monitor one or more power characteristics of the memory system 210. The one or more power characteristics may include the power state 240 of the memory system 210, a load metric for operating the memory system 210, or both. In some examples, the load metric may be defined as an actual real-time power consumption of the memory system 210.

The memory system 210 may monitor the power characteristics of the memory system 210 in an aperiodic or periodic manner over a multitude of time occasions. As an example, during a first time occasion, the memory controller 215 may perform a first mode register read on the register 235 to determine a first power state 240 at the first time occasion and during a second time occasion that occurs after the first time occasion, the memory controller 215 may perform a second mode register read on the register 235 to determine a second power state 240 at the second time occasions. As described herein, the host system 205 may change the power state 240. However, in some examples, the power state 240 may not change between each time occasion, but instead, may change at a varying rate (e.g., every one or more time occasions).

To monitor the load metric, the memory controller 215 may transmit a request for a first load metric to the power management component 220 during a first time occasion. Upon receiving the request for the load metric, the power management component 220 may transmit signaling to the memory controller 215 indicating the first load metric at the first time occasion. The power management component 220 may be coupled with the host system 205 and may be an example of a power management integrated circuit (PMIC) that includes multiple voltage regulators and control circuits to support functions such as battery management, voltage regulation, and charging for the memory system 210. At a second time occasion, the memory system 210 may repeat the above process to determine a second load metric at a second time occasion that occurs after the first time occasion.

Additionally or alternatively, the power management component 220 may transmit the signaling indicating the load metric without the request from the memory controller 215. For example, the power management component 220 may monitor the load metric during the multiple time occasions and compare the load metric observed at each time occasion to a threshold (e.g., 30 W). If the load metric satisfies (e.g., exceeds) the threshold, the power management component 220 may transmit the signaling indicating the load metric at the time occasion in which the load metric met or exceeded the threshold.

At each time occasion, the memory controller 215 (or firmware 225 of the memory controller 215) may determine whether or not to update the policy for managing power consumed by the memory system 210. As one example, the memory system 210 may initially (e.g., at boot or initialization of the memory system 210) operate according to a first policy which may refer to operating the memory system 210 with the PPM feature turned off. Upon initialization, the memory system 210 may monitor the one or more power characteristics during a first set of time occasions and operate the memory system 210 according to a second policy based on the one or more power characteristics satisfying a condition during at least one timing occasions of the first set of the timing occasions. Operating the memory system 210 according to the second policy may refer to operating the memory system 210 with the PPM feature turned on.

Upon activating the PPM feature, the memory system 210 may continue to monitor the one or more power characteristics during a second set of timing occasions and, in some examples, may operate the memory system 210 according to the first policy based on the power characteristics no longer satisfying the condition during at least one timing occasions of the second set of the timing occasions.

In some examples, the condition may include the power state 240 satisfying (e.g., exceeding) a threshold power state. As an example, the threshold power state may be a high power state such as the 40 W power state. If the power state 240 satisfies (e.g., exceeds) the threshold power state, the memory system 210 may operate according to the second policy (or activate PPM) feature or continue operating according to the second policy if the second policy is already activated. Alternatively, if the power state 240 does not satisfy (e.g., exceed) the threshold power state, the memory system 210 may operate according to the first policy (e.g., deactivate the PPM feature or adjust one or more parameters associated with the PPM feature) or continue operating according to the first policy if the first policy is already activated.

In another example, the condition may include the load metric satisfying (e.g., exceeding) a threshold load metric. As an example, the threshold load metric may be 1.3 times the current power state 240 of the memory system 210. For example, if the power state 240 for the memory system 210 is 40 W, the threshold load metric may be 52 W. If the load metric satisfies (e.g., exceeds) the threshold load metric, the memory system 210 may operate according to the second policy (or activate the PPM feature) or continue operating according to the second policy if the second policy is already activated. Alternatively, if the load metric does not satisfy (e.g., not exceed) the threshold load metric, the memory system 210 may operate according to the first policy (e.g., deactivate the PPM feature or adjust one or more parameters associated with the PPM feature) or continue operating according to the first policy if the first policy is already activated.

In some examples, the memory system 210 may determine whether the load metric satisfies the condition in response to the power state 240 of the memory system satisfying (e.g., exceeding) a power state threshold. As an example, the power state 240 threshold may be a high power state (e.g., a 40 W power state). If the power state 240 satisfies (e.g., exceeds) the power state threshold, the memory system 210 may assess whether the load metric satisfies the condition. If the power state 240 does not satisfy (e.g., not exceed) the power state threshold, the memory system 210 may not assess whether the load metric satisfies the condition. In other words, the memory system 210 may continue to operate according to the first policy even if the load metric satisfies (e.g., exceeds) the load metric threshold if the power state 240 does not satisfy (e.g., not exceed) the power state threshold. Further, the power state 240 satisfying (e.g., exceeding) the power state threshold may trigger communication between the memory controller 215 and the power management component 220 to obtain the load metric.

As yet another example, the memory system 210 may take into account both the power state 240 and the load metric when determining whether to operate the memory system 210 according to the first policy or the second policy. For example, the condition may include a difference between the load metric and the power state 240 being below a threshold. To determine the difference, the memory system 210 may subtract the power state 240 from the load metric at a time occasion. As one example, the difference may be equal to 15 W. In such example, a power state of 40 W and a load metric of 30 W would satisfy the condition because the resulting difference would be equal to 10 W which is less than 15 W. In some examples, the memory system 210 may impose this condition when the power state 240 of the memory system 210 is a high power state (e.g., 40 W) and may not impose this condition when the power state 240 of the memory system 210 is a low power state (e.g., 15 W or 20 W). Further, in some examples, to avoid sudden changes in policy (e.g., from the first policy to the second policy or from the second policy to the first policy), the memory system 210 may apply a hysteresis.

Using the methods as described herein may allow the memory system 210 to implement or activate a power management policy to reduce a peak power to average power ratio on a as needed basis which may mitigate unnecessary performance loss resulting from performing power management policy in a static fashion (operating with PPM always on).

Figure 3:
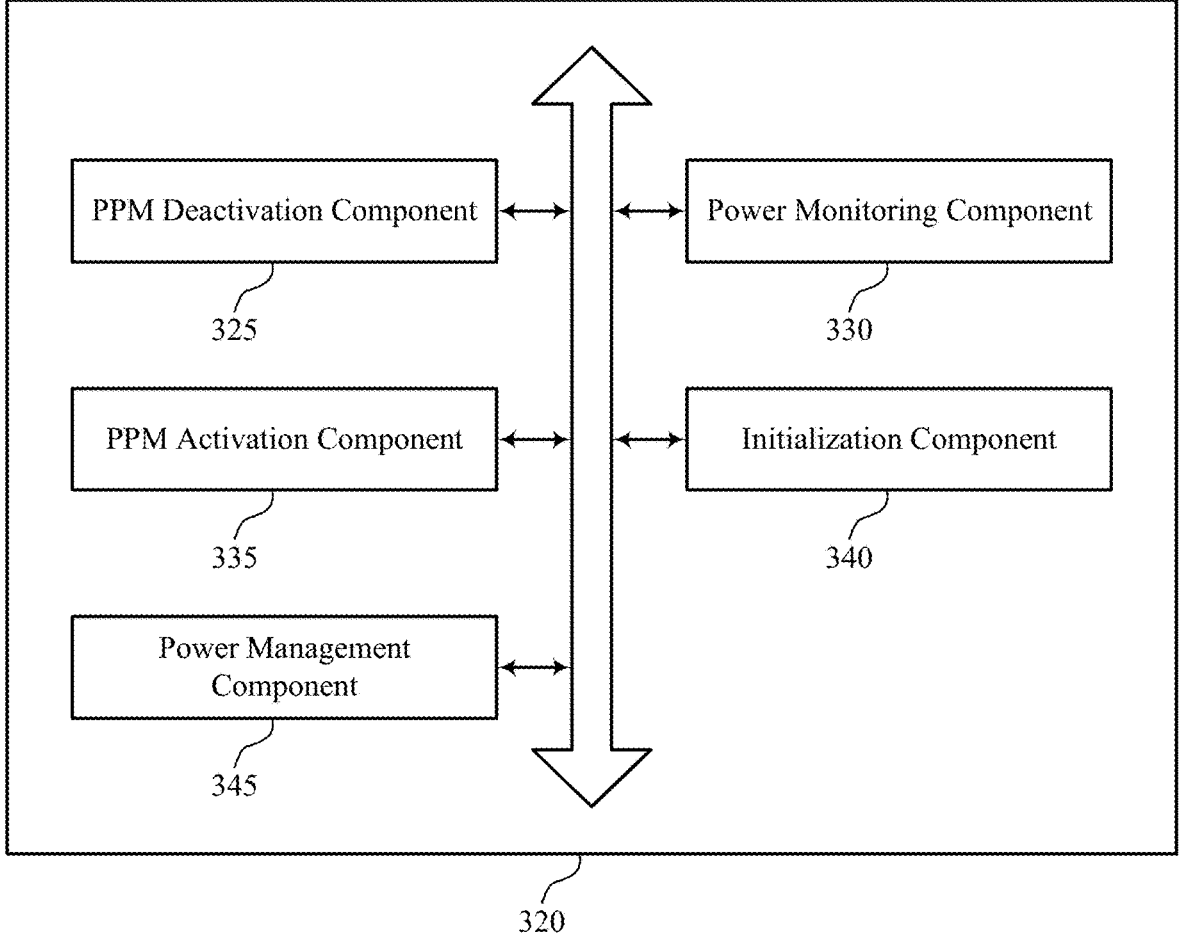
FIG. 3 shows a block diagram of a memory system that supports peak power control of a memory system in accordance with examples as disclosed herein.

FIG. 3 shows a block diagram 300 of a memory system 320 that supports peak power control of a memory system in accordance with examples as disclosed herein. The memory system 320 may be an example of aspects of a memory system as described with reference to FIGS. 1 through 2. The memory system 320, or various components thereof, may be an example of means for performing various aspects of peak power control of a memory system as described herein. For example, the memory system 320 may include a PPM deactivation component 325, a power monitoring component 330, a PPM activation component 335, an initialization component 340, a power management component 345, or any combination thereof. Each of these components, or components of subcomponents thereof (e.g., one or more processors, one or more memories), may communicate, directly or indirectly, with one another (e.g., via one or more buses).

The PPM deactivation component 325 may be configured as or otherwise support a means for operating the memory system according to a first policy for managing power consumed by the memory system, where the first policy is based at least in part on a ratio between a peak power consumed by the memory system and an average power consumed by the memory system over a duration. The power monitoring component 330 may be configured as or otherwise support a means for monitoring one or more power characteristics associated with operating the memory system. The PPM activation component 335 may be configured as or otherwise support a means for operating the memory system according to a second policy for managing the power consumed by the memory system based at least in part on the one or more power characteristics satisfying a condition, where operating the memory system according to the second policy includes activating a PPM feature of the memory system.

In some examples, the initialization component 340 may be configured as or otherwise support a means for initializing the memory system, where operating the memory system according to the first policy is based at least in part on initializing the memory system.

In some examples, to support operating the memory system according to the first policy, the PPM deactivation component 325 may be configured as or otherwise support a means for deactivating the PPM feature of the memory system. In some examples, to support operating the memory system according to the first policy, the PPM deactivation component 325 may be configured as or otherwise support a means for adjusting one or more parameters associated with the PPM feature of the memory system and operating the memory system in accordance with the one or more adjusted parameters.

In some examples, the power management component 345 may be configured as or otherwise support a means for determining, based at least in part on monitoring the one or more power characteristics, that a power state of the memory system is above a threshold, the one or more power characteristics including the power state, where operating the memory system according to the second policy is based at least in part on the power state being above the threshold.

In some examples, the power management component 345 may be configured as or otherwise support a means for determining that the power state of the memory system is below the threshold, where operating the memory system according to the first policy is based at least in part on the power state being below the threshold.

In some examples, to support monitoring the one or more power characteristics, the power management component 345 may be configured as or otherwise support a means for reading, from a register of the memory system, the power state of the memory system, where operating the memory system according to the second policy is based at least in part on reading the power state from the register.

In some examples, the power management component 345 may be configured as or otherwise support a means for determining, based at least in part on monitoring the one or more power characteristics, that a load metric for operating the memory system is above a first threshold, the one or more power characteristics including the load metric, where operating the memory system according to the second policy is based at least in part on the load metric being above the first threshold.

In some examples, the power management component 345 may be configured as or otherwise support a means for determining that the load metric for operating the memory system is below the first threshold, where operating the memory system according to the first policy is based at least in part on the load metric being below the first threshold.

In some examples, to support monitoring the one or more power characteristics, the power monitoring component 330 may be configured as or otherwise support a means for monitoring, by a power management circuit of the memory system that is coupled with a host system, power consumed by the memory system over a plurality of time occasions, where the load metric includes the power consumed by the memory system at a first time occasion of the plurality of time occasions.

In some examples, the power monitoring component 330 may be configured as or otherwise support a means for transmitting, from a memory controller of the memory system and to the power management circuit, first signaling requesting the load metric for operating the memory system at the first time occasion. In some examples, the power monitoring component 330 may be configured as or otherwise support a means for receiving, from the power management circuit, second signaling indicating the load metric for operating the memory system at the first time occasion based at least in part on the first signaling.

In some examples, the power management component 345 may be configured as or otherwise support a means for determining, based at least in part on monitoring the one or more power characteristics, that a power state of the memory system is above a second threshold, the one or more power characteristics further including the power state, where determining the load metric is above the first threshold is based at least in part on the power state being above the second threshold.

In some examples, the power management component 345 may be configured as or otherwise support a means for determining a difference between a power state of the memory system and a load metric for operating the memory system, the one or more power characteristics including the power state and the load metric, where operating the memory system according to the second policy is based at least in part on the difference being below a threshold.

In some examples, to support operating the memory system according to the first policy, the PPM deactivation component 325 may be configured as or otherwise support a means for operating the memory system using a first set of trim parameters associated with the first policy.

In some examples, to support operating the memory system according to the second policy, the PPM activation component 335 may be configured as or otherwise support a means for loading a second set of trim parameters associated with the second policy, the second set of trim parameters different than the first set of trim parameters. In some examples, to support operating the memory system according to the second policy, the PPM activation component 335 may be configured as or otherwise support a means for operating the memory system using the second set of trim parameters.

In some examples, to support operating the memory system according to the first policy, the PPM deactivation component 325 may be configured as or otherwise support a means for performing one or more first memory operations at a first memory device of the memory system according to one or more timing parameters.

In some examples, to support operating the memory system according to the second policy, the PPM activation component 335 may be configured as or otherwise support a means for updating at least one timing parameter of the one or more timing parameters. In some examples, to support operating the memory system according to the second policy, the PPM activation component 335 may be configured as or otherwise support a means for performing one or more second memory operations at the first memory device according to the updated at least one timing parameter.

In some examples, the described functionality of the memory system 320, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 320, or various components thereof, may be implemented at least in part by instructions (e.g., stored in memory, non-transitory computer-readable medium) executable by such at least one processor.

FIG. 4 shows a flowchart illustrating a method 400 that supports peak power control of a memory system in accordance with examples as disclosed herein. The operations of method 400 may be implemented by a memory system or its components as described herein. For example, the operations of method 400 may be performed by a memory system as described with reference to FIGS. 1 through 3. In some examples, a memory system may execute a set of instructions to control the functional elements of the device to perform the described functions. Additionally, or alternatively, the memory system may perform aspects of the described functions using special-purpose hardware.

At 405, the method may include operating the memory system according to a first policy for managing power consumed by the memory system, where the first policy is based at least in part on a ratio between a peak power consumed by the memory system and an average power consumed by the memory system over a duration. In some examples, aspects of the operations of 405 may be performed by a PPM deactivation component 325 as described with reference to FIG. 3.

At 410, the method may include monitoring one or more power characteristics associated with operating the memory system. In some examples, aspects of the operations of 410 may be performed by a power monitoring component 330 as described with reference to FIG. 3.

At 415, the method may include operating the memory system according to a second policy for managing the power consumed by the memory system based at least in part on the one or more power characteristics satisfying a condition, where operating the memory system according to the second policy includes activating a PPM feature of the memory system. In some examples, aspects of the operations of 415 may be performed by a PPM activation component 335 as described with reference to FIG. 3.

In some examples, an apparatus as described herein may perform a method or methods, such as the method 400. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for operating the memory system according to a first policy for managing power consumed by the memory system, where the first policy is based at least in part on a ratio between a peak power consumed by the memory system and an average power consumed by the memory system over a duration; monitoring one or more power characteristics associated with operating the memory system; and operating the memory system according to a second policy for managing the power consumed by the memory system based at least in part on the one or more power characteristics satisfying a condition, where operating the memory system according to the second policy includes activating a PPM feature of the memory system.

Aspect 2: The method, apparatus, or non-transitory computer-readable medium of aspect 1, further including operations, features, circuitry, logic, means, or instructions, or any combination thereof for initializing the memory system, where operating the memory system according to the first policy is based at least in part on initializing the memory system.

Aspect 3: The method, apparatus, or non-transitory computer-readable medium of any of aspects 1 through 2, where operating the memory system according to the first policy includes operations, features, circuitry, logic, means, or instructions, or any combination thereof for deactivating the PPM feature of the memory system.

Aspect 4: The method, apparatus, or non-transitory computer-readable medium of any of aspects 1 through 2, where operating the memory system according to the first policy includes operations, features, circuitry, logic, means, or instructions, or any combination thereof for adjusting one or more parameters associated with the PPM feature of the memory system and operating the memory system in accordance to the one or more adjusted parameters.

Aspect 5: The method, apparatus, or non-transitory computer-readable medium of any of aspects 1 through 3, further including operations, features, circuitry, logic, means, or instructions, or any combination thereof for determining, based at least in part on monitoring the one or more power characteristics, that a power state of the memory system is above a threshold, the one or more power characteristics including the power state, where operating the memory system according to the second policy is based at least in part on the power state being above the threshold.

Aspect 6: The method, apparatus, or non-transitory computer-readable medium of aspect 5, further including operations, features, circuitry, logic, means, or instructions, or any combination thereof for determining that the power state of the memory system is below the threshold, where operating the memory system according to the first policy is based at least in part on the power state being below the threshold.

Aspect 7: The method, apparatus, or non-transitory computer-readable medium of any of aspects 5 through 6, where monitoring the one or more power characteristics includes operations, features, circuitry, logic, means, or instructions, or any combination thereof for reading, from a register of the memory system, the power state of the memory system, where operating the memory system according to the second policy is based at least in part on reading the power state from the register.

Aspect 8: The method, apparatus, or non-transitory computer-readable medium of any of aspects 1 through 7, further including operations, features, circuitry, logic, means, or instructions, or any combination thereof for determining, based at least in part on monitoring the one or more power characteristics, that a load metric for operating the memory system is above a first threshold, the one or more power characteristics including the load metric, where operating the memory system according to the second policy is based at least in part on the load metric being above the first threshold.

Aspect 9: The method, apparatus, or non-transitory computer-readable medium of aspect 8, further including operations, features, circuitry, logic, means, or instructions, or any combination thereof for determining that the load metric for operating the memory system is below the first threshold, where operating the memory system according to the first policy is based at least in part on the load metric being below the first threshold.

Aspect 10: The method, apparatus, or non-transitory computer-readable medium of any of aspects 8 through 9, where monitoring the one or more power characteristics includes operations, features, circuitry, logic, means, or instructions, or any combination thereof for monitoring, by a power management circuit of the memory system that is coupled with a host system, power consumed by the memory system over a plurality of time occasions, where the load metric includes the power consumed by the memory system at a first time occasion of the plurality of time occasions.

Aspect 11: The method, apparatus, or non-transitory computer-readable medium of aspect 10, further including operations, features, circuitry, logic, means, or instructions, or any combination thereof for transmitting, from a memory controller of the memory system and to the power management circuit, first signaling requesting the load metric for operating the memory system at the first time occasion and receiving, from the power management circuit, second signaling indicating the load metric for operating the memory system at the first time occasion based at least in part on the first signaling.

Aspect 12: The method, apparatus, or non-transitory computer-readable medium of any of aspects 8 through 11, further including operations, features, circuitry, logic, means, or instructions, or any combination thereof for determining, based at least in part on monitoring the one or more power characteristics, that a power state of the memory system is above a second threshold, the one or more power characteristics further including the power state, where determining the load metric is above the first threshold is based at least in part on the power state being above the second threshold.

Aspect 13: The method, apparatus, or non-transitory computer-readable medium of any of aspects 1 through 12, further including operations, features, circuitry, logic, means, or instructions, or any combination thereof for determining a difference between a power state of the memory system and a load metric for operating the memory system, the one or more power characteristics including the power state and the load metric, where operating the memory system according to the second policy is based at least in part on the difference being below a threshold.

Aspect 14: The method, apparatus, or non-transitory computer-readable medium of any of aspects 1 through 13, where operating the memory system according to the first policy includes operations, features, circuitry, logic, means, or instructions, or any combination thereof for operating the memory system using a first set of trim parameters associated with the first policy.

Aspect 15: The method, apparatus, or non-transitory computer-readable medium of aspect 14, where operating the memory system according to the second policy includes operations, features, circuitry, logic, means, or instructions, or any combination thereof for loading a second set of trim parameters associated with the second policy, the second set of trim parameters different than the first set of trim parameters and operating the memory system using the second set of trim parameters.

Aspect 16: The method, apparatus, or non-transitory computer-readable medium of any of aspects 1 through 15, where operating the memory system according to the first policy includes operations, features, circuitry, logic, means, or instructions, or any combination thereof for performing one or more first memory operations at a first memory device of the memory system according to one or more timing parameters.

Aspect 17: The method, apparatus, or non-transitory computer-readable medium of aspect 16, where operating the memory system according to the second policy includes operations, features, circuitry, logic, means, or instructions, or any combination thereof for updating at least one timing parameter of the one or more timing parameters and performing one or more second memory operations at the first memory device according to the updated at least one timing parameter.

FIG. 5 shows a flowchart illustrating a method 500 that supports peak power control of a memory system in accordance with examples as disclosed herein. The operations of method 500 may be implemented by a memory system or its components as described herein. For example, the operations of method 500 may be performed by a memory system as described with reference to FIGS. 1 through 3. In some examples, a memory system may execute a set of instructions to control the functional elements of the device to perform the described functions. Additionally, or alternatively, the memory system may perform aspects of the described functions using special-purpose hardware.

At 505, the method may include initializing the memory system. In some examples, aspects of the operations of 505 may be performed by an initialization component 340 as described with reference to FIG. 3.

At 510, the method may include operating the memory system according to a first policy for managing power consumed by the memory system based at least in part on initializing the memory system, where the first policy is based at least in part on a ratio between a peak power consumed by the memory system and an average power consumed by the memory system over a duration. In some examples, aspects of the operations of 510 may be performed by a PPM deactivation component 325 as described with reference to FIG. 3.

At 515, the method may include monitoring one or more power characteristics associated with operating the memory system. In some examples, aspects of the operations of 515 may be performed by a power monitoring component 330 as described with reference to FIG. 3.

At 520, the method may include operating the memory system according to a second policy for managing the power consumed by the memory system based at least in part on the one or more power characteristics satisfying a condition, where operating the memory system according to the second policy includes activating a PPM feature of the memory system. In some examples, aspects of the operations of 520 may be performed by a PPM activation component 335 as described with reference to FIG. 3.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method by a memory system, comprising:
operating the memory system according to a first policy for managing power consumed by the memory system, wherein the first policy is based at least in part on a ratio between a peak power consumed by the memory system and an average power consumed by the memory system over a duration;
monitoring one or more power characteristics associated with operating the memory system; and
operating the memory system according to a second policy for managing the power consumed by the memory system based at least in part on the one or more power characteristics satisfying a condition, wherein operating the memory system according to the second policy comprises activating a peak power management feature of the memory system.

2. The method of claim 1, further comprising:
initializing the memory system, wherein operating the memory system according to the first policy is based at least in part on initializing the memory system.

3. The method of claim 1, wherein operating the memory system according to the first policy comprises:
adjusting one or more parameters associated with the peak power management feature of the memory system; and
operating the memory system in accordance with the one or more adjusted parameters.

4. The method of claim 1, wherein operating the memory system according to the first policy comprises:
deactivating the peak power management feature of the memory system.

5. The method of claim 1, further comprising:
determining, based at least in part on monitoring the one or more power characteristics, that a power state of the memory system is above a threshold, the one or more power characteristics comprising the power state, wherein operating the memory system according to the second policy is based at least in part on the power state being above the threshold.

6. The method of claim 5, further comprising:
determining that the power state of the memory system is below the threshold, wherein operating the memory system according to the first policy is based at least in part on the power state being below the threshold.

7. The method of claim 5, wherein monitoring the one or more power characteristics comprises:
reading, from a register of the memory system, the power state of the memory system, wherein operating the memory system according to the second policy is based at least in part on reading the power state from the register.

8. The method of claim 1, further comprising:
determining, based at least in part on monitoring the one or more power characteristics, that a load metric for operating the memory system is above a first threshold, the one or more power characteristics comprising the load metric, wherein operating the memory system according to the second policy is based at least in part on the load metric being above the first threshold.

9. The method of claim 8, further comprising:
determining that the load metric for operating the memory system is below the first threshold, wherein operating the memory system according to the first policy is based at least in part on the load metric being below the first threshold.

10. The method of claim 8, further comprising:

determining, based at least in part on monitoring the one or more power characteristics, that a power state of the memory system is above a second threshold, the one or more power characteristics further comprising the power state, wherein determining the load metric is above the first threshold is based at least in part on the power state being above the second threshold.

11. The method of claim 8, wherein monitoring the one or more power characteristics comprises:

monitoring, by a power management circuit of the memory system that is coupled with a host system, power consumed by the memory system over a plurality of time occasions, wherein the load metric comprises the power consumed by the memory system at a first time occasion of the plurality of time occasions.

12. The method of claim 11, further comprising:

transmitting, from a memory controller of the memory system and to the power management circuit, first signaling requesting the load metric for operating the memory system at the first time occasion; and receiving, from the power management circuit, second signaling indicating the load metric for operating the memory system at the first time occasion based at least in part on the first signaling.

13. The method of claim 1, further comprising:

determining a difference between a power state of the memory system and a load metric for operating the memory system, the one or more power characteristics comprising the power state and the load metric, wherein operating the memory system according to the second policy is based at least in part on the difference being below a threshold.

14. The method of claim 1, wherein operating the memory system according to the first policy comprises:

operating the memory system using a first set of trim parameters associated with the first policy.

15. The method of claim 14, wherein operating the memory system according to the second policy comprises:

loading a second set of trim parameters associated with the second policy, the second set of trim parameters different than the first set of trim parameters; and operating the memory system using the second set of trim parameters.

16. The method of claim 1, wherein operating the memory system according to the first policy comprises:

performing one or more first memory operations at a first memory device of the memory system according to one or more timing parameters.

17. The method of claim 16, wherein operating the memory system according to the second policy comprises:

updating at least one timing parameter of the one or more timing parameters; and performing one or more second memory operations at the first memory device according to the updated at least one timing parameter.

18. A non-transitory computer-readable medium storing code, the code comprising instructions executable by one or more processors to:

operate a memory system according to a first policy for managing power consumed by the memory system, wherein the first policy is based at least in part on a ratio between a peak power consumed by the memory system and an average power consumed by the memory system over a duration;

monitor one or more power characteristics associated with operating the memory system; and operate the memory system according to a second policy for managing the power consumed by the memory system based at least in part on the one or more power characteristics satisfying a condition, wherein operating the memory system according to the second policy comprises activating a peak power management feature of the memory system.

19. The non-transitory computer-readable medium of claim 18, wherein the instructions are further executable by the one or more processors to:

initialize the memory system, wherein operating the memory system according to the first policy is based at least in part on initializing the memory system.

20. A memory system, comprising:

one or more memory devices; and processing circuitry coupled with the one or more memory devices and configured to cause the memory system to:

operate the memory system according to a first policy for managing power consumed by the memory system, wherein the first policy is based at least in part on a ratio between a peak power consumed by the memory system and an average power consumed by the memory system over a duration;

monitor one or more power characteristics associated with operating the memory system; and operate the memory system according to a second policy for managing the power consumed by the memory system based at least in part on the one or more power characteristics satisfying a condition, wherein operating the memory system according to the second policy comprises activating a peak power management feature of the memory system.

\* \* \* \* \*